United States Patent [19]

Hisey

[11] Patent Number: 5,355,045

[45] Date of Patent: * Oct. 11, 1994

[54] TORQUE REACTION TRANSFER IN DYNAMOELECTRIC MACHINES HAVING ENERGY-EFFICIENT STATOR CONSTRUCTIONS

[76] Inventor: Bradner L. Hisey, 19325 Athos Pl., Saratoga, Calif. 95070

[*] Notice: The portion of the term of this patent subsequent to May 4, 2010 has been disclaimed.

[21] Appl. No.: 29,757

[22] Filed: Mar. 10, 1993

Related U.S. Application Data

[63] Continuation-in-part of Ser. No. 867,270, Apr. 10, 1992, Pat. No. 5,235,231, which is a continuation-in-part of Ser. No. 684,569, Apr. 12, 1991, Pat. No. 5,208,503.

[51] Int. Cl.$^5$ .............................................. H02K 1/12
[52] U.S. Cl. ..................... 310/259; 310/216; 310/42; 29/596
[58] Field of Search ................. 310/259, 261, 260, 42, 310/43, 44, 125, 216, 217, 258, 257, 254; 29/596

[56] References Cited

U.S. PATENT DOCUMENTS

| | | | |
|---|---|---|---|
| 3,983,435 | 9/1976 | Sims | 310/259 |
| 4,395,815 | 8/1983 | Stanley et al. | 310/216 X |
| 5,208,503 | 5/1993 | Hisey | 310/259 |

*Primary Examiner*—Steven L. Stephan
*Assistant Examiner*—Ed To
*Attorney, Agent, or Firm*—Skjerven, Morrill, MacPherson, Franklin & Friel

[57] ABSTRACT

In a radial gap dynamoelectric machine a composite stator ferromagnetic structure having reduced losses is formed using thin section metallic glass or electrical steel strips folded or otherwise periodically deflected on one side or another of one or more planes perpendicular to the machine longitudinal axis edge wound to form a ring-like magnetic structure surrounding separate stator tooth assemblies formed of traditional or thin-section sheet or powdered ferromagnetic materials. Alternative structures are described.

25 Claims, 16 Drawing Sheets

TORQUE REACTION TRANSFER IN DYNAMOELECTRIC MACHINES HAVING ENERGY-EFFICIENT STATOR CONSTRUCTIONS

This invention relates to dynamoelectric machines having energy-efficient stator construction and more particularly to composite stator constructions utilizing low-loss amorphous ferromagnetic material (metallic glass) and/or thin section electrical steels. This application is a continuation-in-part of application Ser. No. 07/867,270 filed on Apr. 12, 1992, now U.S. Pat. No. 5,235,231 which in turn is a continuation-in-part of application Ser. No. 07/684,569 filed on Apr. 12, 1991 now U.S. Pat. No. 5,208,503.

BACKGROUND OF THE INVENTION

Stator lamination iron losses heretofore have dominated energy dissipation in most dynamoelectric machines. There is therefore a need to increase the efficiency of dynamoelectric machines particularly with respect to stator iron losses.

Amorphous ferromagnetic material (AFM) lacks crystalline structure and has about one-tenth the iron losses of common crystalline iron alloys. It is formed in a sheet roughly 1 mil thick, (as compared to 12–14 mils of common electrical steels) with a hardness in the range of 63–70 Rockwell C, like many tool steels, so that it is machined only by grinding, electric discharge machining or lasers. Such machining risks heat-inducing crystal formation and magnetic performance degradation. AFM may be slit and sheared economically. Punching of AFM, as for stator laminations, is impractical due to material hardness and very thin sections. Iron losses in dynamoelectric machines can also be reduced with thin section (under the usual 12–14 mils) electrical steels, most commonly silicon alloyed, which are more readily fabricated than are AFMs.

Sims, in U.S. Pat. No. 3,983,435, enunciated several dynamoelectric machine stator structures formed from a folded ferromagnetic strip. In several of Sims' configurations the stator poles or teeth are formed of the strip folded in a variety of ways, all having the plane of the folded strip disposed generally parallel to the dynamoelectric machine longitudinal axis, and the yoke or "back iron" being formed of an unfolded plane strip edge wound so that the plane of the strip is disposed generally normal to the machine longitudinal axis.

Stanley, in U.S. Pat. No. 4,395,815, describes a process of forming stator structures from an edge wound strip. The stator slots are notched from a single edge of the ferromagnetic strip, leaving poles, and the remainder of the strip, which is to form the yoke or back iron, is axially deformed along one edge by regularly spaced depressions or deformations, extending partially across the yoke or back iron portion of the strip, to cause the strip to turn in its own plane.

SUMMARY OF THE INVENTION

In accordance with this invention a composite stator for radial-gap motors is provided. The stator utilizes a ferromagnetic strip having folds or deflections extending entirely across the strip, much like fanfolds in common computer paper. These folds or deflections impart to the ferromagnetic strip the flexibility to be readily edge wound into a fanfolded stator magnetic circuit ring. The other components in a composite stator structure, such as stator tooth assemblies and stator support rings, may be configured so that motor torque reaction is transferred from the stator tooth assembly through stator support rings to the motor frame without passing through the fanfolded stator magnetic circuit ring, thus reducing mechanical stress on the fanfolded stator magnetic circuit ring. Such stress may adversely affect the performance of materials such as AFM which are magnetostrictive.

The structure of this invention including composite stator structures is usable with radial-gap dynamoelectric machines in addition to motors. The basic ferromagnetic strip folding and the mating stator support rings of the invention give this invention broad applicability. Improved folding patterns are described which decrease mechanical stresses in the folded ferromagnetic strip and improve the torsional stiffness of the stator support rings and their ability to transfer torque reaction from stator tooth assembly to dynamoelectric machine frame.

THE DRAWINGS

FIG. 2b is a cutaway isometric view of a segment of fanfolded stator magnetic circuit ring using the fanfolded laminations of FIG. 2a.

FIG. 6b is a cutaway isometric view of a segment of a generally fanfolded magnetic circuit ring having minor folds along the inner edges of the fanfolded faces which mates axially with the fan folded stator support ring of FIG. 6a.

FIG. 7b is a cutaway isometric view of a segment of a stator support ring having minor folds extending entirely across the fanfolded faces from inner edge to outer edge, which stator support ring mates axially with the fanfolded stator magnetic circuit ring of FIG. 7a.

FIG. 9b is a cutaway isometric view of a segment of folded stator magnetic circuit ring which mates axially with the folded stator support ring of FIG. 9a.

FIG. 10b is a cutaway isometric view of a segment of a stator support ring which mates axially with the sinuous stator magnetic circuit ring of FIG. 10a.

DESCRIPTION OF THE PREFERRED EMBODIMENTS

Figure 1:
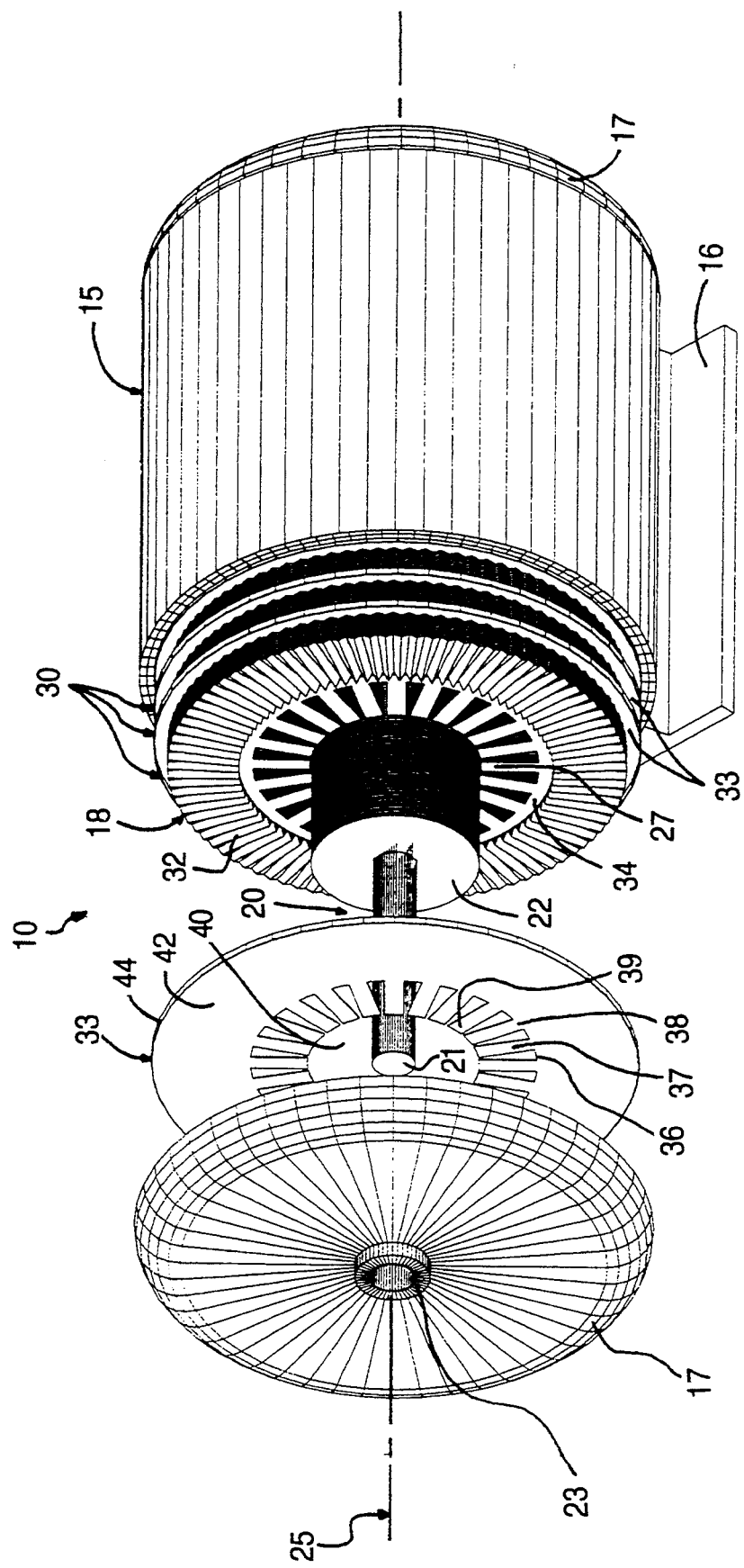
FIG. 1 is a partially exploded isometric view of a radial-gap dynamoelectric machine incorporating a composite stator construction of the present invention.

A radial-gap dynamoelectric machine 10, representative of the present invention, as shown in FIG. 1, consists of an open ended cylindrical frame 15 mounted on a base 16, with the ends being closed by end bells 17. A composite stator assembly 18 is secured within the cylindrical frame 15. A rotor assembly 20 comprised of a shaft 21 having a cylindrical laminated ferromagnetic stack 22 mounted thereon and conductors therein (not shown) is rotatably mounted in bearing assemblies 23 provided in the end bells 17 for rotation about the dynamoelectric machine longitudinal axis 25. The rotor assembly 20 is separated from the composite stator assembly 18 by a radially narrow cylindrical air gap 27.

The composite stator assembly 18 is comprised of at least one and generally a plurality of longitudinally spaced-apart axial segments 30. Each axial segment 30 is comprised of an outer fanfolded stator magnetic circuit ring (SMCR) axial segment 32, at least one stator support ring (SSR) 33, and an inner stator tooth assembly (STA) axial segment 34.

A plane SSR 33 is exploded from the left end of FIG. 1 of the composite stator assembly 18. Each SSR 33 has circumferentially spaced apart keystone-shaped winding slots 36 forming teeth or poles 37 therebetween. The teeth 37 have roots 38 and tips 39. The inner margins or tips 39 of the teeth 37 generally define the cylindrical space, commonly called the stator bore 40, in which the rotor assembly 20 rotates. The teeth 37 are formed integrally with a plane ring 42 which is here provided with an outer rim or flange 44.

Figure 2A:
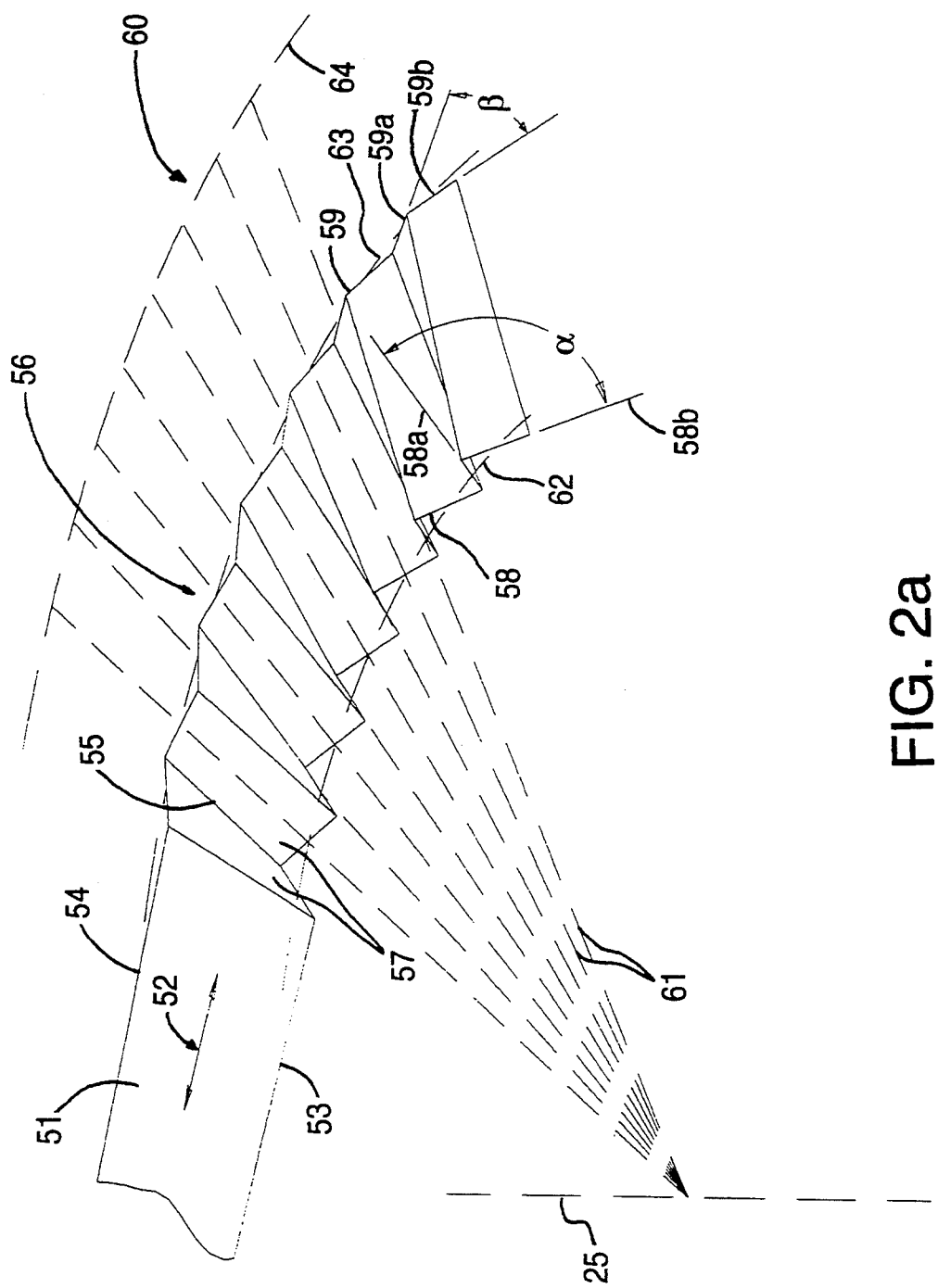
FIG. 2a is a cutaway isometric view of a fanfolded ferromagnetic strip stator lamination used in the composite stator construction of the present invention illustrating the geometry of the folding pattern.

As shown in FIG. 2a, the fanfolded SMCR axial segments 32 are formed from straight elongate ferromagnetic strips 51 (the term strip is used generically hereinafter to refer to continuous, interrupted, single and plural elongate ferromagnetic strips formed singly or simultaneously in groups and disposed as described hereinbelow) having longitudinal axis (also called a centerline CL) 52 and first inner edge 53 and second inner edge 54, of low-loss AFM or thin electrical steel which has been folded, with folds 55 extending entirely across the longitudinal axis 52 the strip. In contrast to straight elongate (unfolded) strip 51, which is rigid in the plane of the strip, such fanfolded strip 56 is easily deflected in any direction about the nominal longitudinal axis 52 of the unfolded strip. The folds 55 have faces 57 on opposite sides of each fold line 55. Each face 56 is bounded by two fold lines 55. Each face 57 has an inner edge 58 and an outer edge 59. As shown in this FIG. 2a the fanfolded strip is deflected or edge-wound in a plane perpendicular to the dynamoelectric machine longitudinal axis 25.

The folds 55 of an edge-wound figure so fabricated are disposed on alternate axial sides of one or more planes perpendicular to the central axis of the figure, which axis in the present invention is the dynamoelectric machine longitudinal axis 25. The perpendicular plane 60 is indicated by the dashed radial construction lines 61 and the dashed arcs 62, 63, and 64 intersecting said dashed radial construction lines 61. Faces 57 of the fanfolded strip 56 each pass through the perpendicular plane 60. The fold angle (the angular deflection of the straight elongate strip from the longitudinal axis of the strip measured about the fold line 55) $\alpha$ at the inner edge 58 and the fold angle $\beta$ at the outer edge 59 of the edge-wound fanfolded strip 56 are less than 180 degrees so that faces 57 adjacent to a given fold 55 diverge from each other. The fold angle $\alpha$ as shown in FIG. 2a is the sum of the acute angles between edge 58a and plane 60 and between edge 58b and plane 60. The fold angle $\beta$ is similarly defined with respect to edges 59a and 59b. Each face 57 is somewhat twisted between the inner edge 58 and outer edge 59. Also, the fold angle $\alpha$ is greater at the inner edge 58 of the strip than the fold angle $\beta$ at the outer edge of the strip 59, the difference of fold angles being a measure of the twist in each face 57. The projection on a plane perpendicular to longitundinal axis 25 of the inner edge 58 of the fanfolded strip 56 is of lesser length than that of the outer edge 59.

Figure 2B:
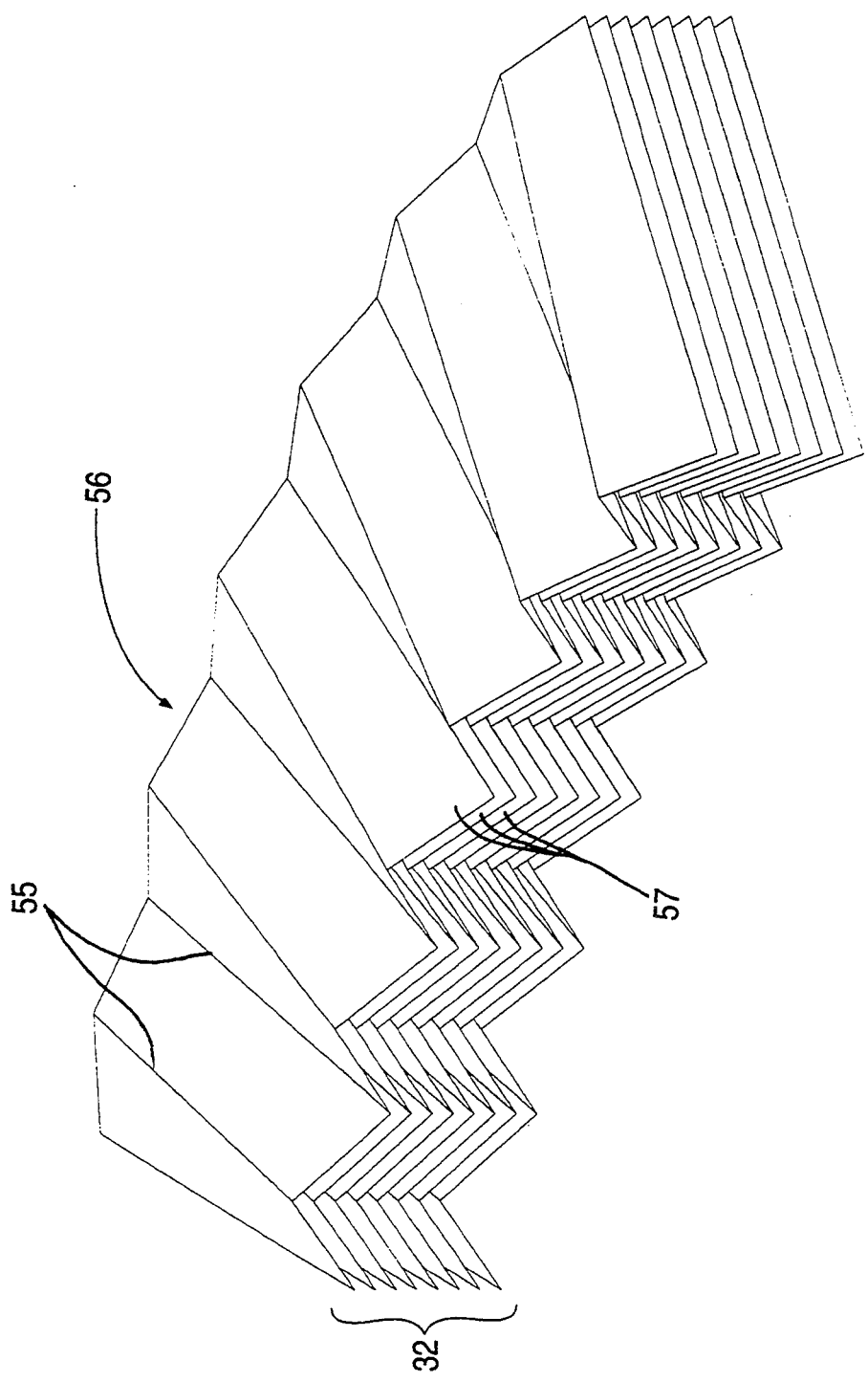

A longitudinal segment of such fanfolded strip 56 may be deflected to form a closed figure about the dynamoelectric machine longitudinal axis 25 with each turn closed end-to-end. Alternatively, and generally more conveniently, said fanfolded strip 56 can be edge-wound continuously as a helix to form an approximate circle (in actuality a polygon since the edges of the strip faces 57 are straight). An axially exploded radial segment of such a fanfolded SMCR axial segment 32 is shown in FIG. 2b. The folds 55 of adjacent turns of the fanfolded strip 56 are disposed in registration and corresponding faces 57 of adjacent turns are in close proximity to each other to form a substantially solid laminated magnetic flux path for use in the stator assembly 18. As suggested by FIG. 1, in practice the laminations in the fanfolded SMCR axial segment 32 are axially contiguous.

Figure 3:
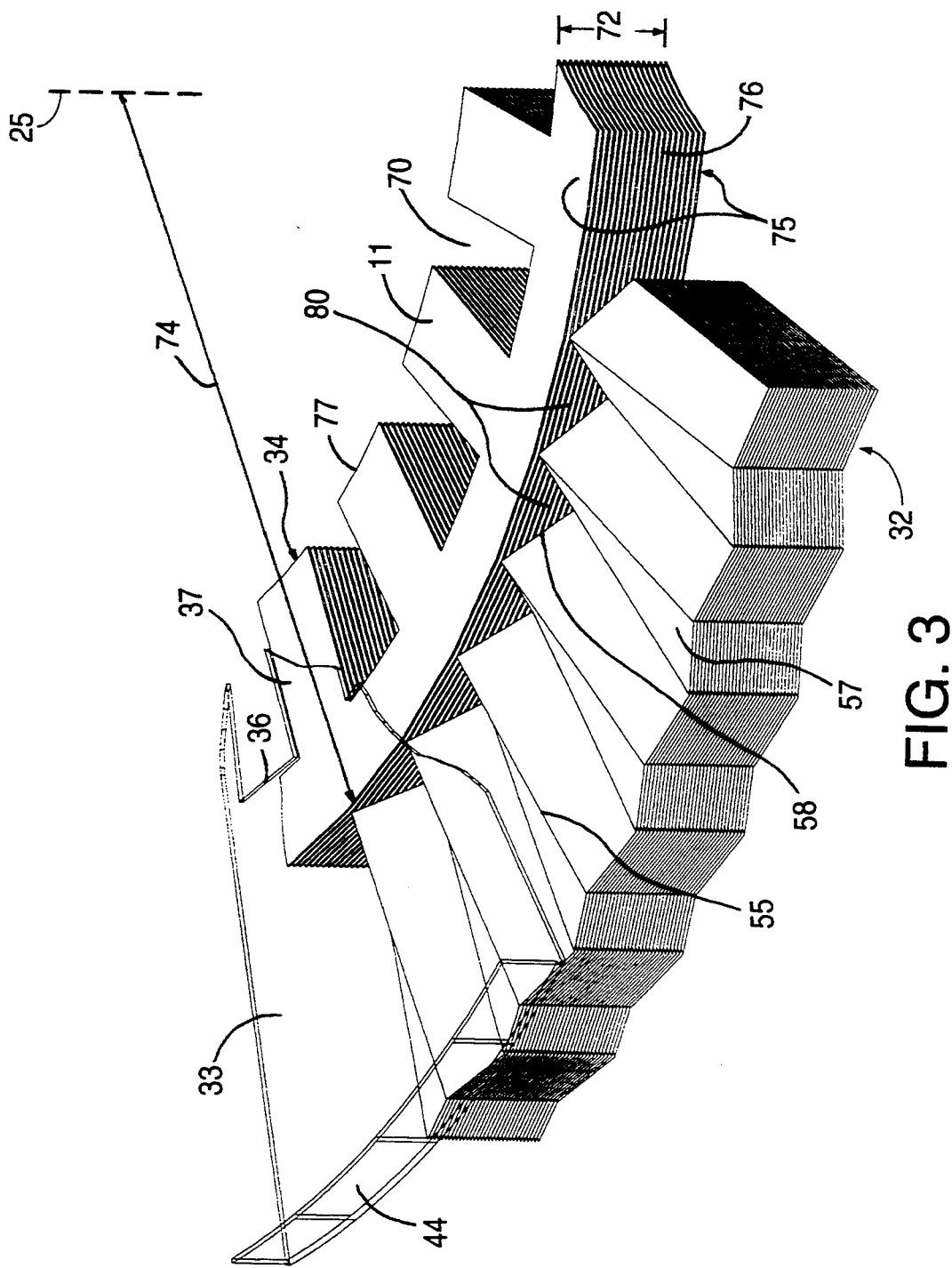
FIG. 3 is a cutaway isometric view an axial segment of the composite stator structure of FIG. 1 showing the relationships of stator tooth assembly, fanfolded stator magnetic circuit ring, and plane stator support ring.

In FIG. 3 the assembled relationships of stator axial segments 30 in FIG. 1 are shown in greater detail in an enlarged radial segment. STA axial segments 34 are comprised of laminations having alternately disposed slots 70 and teeth 71 projecting towards the dynamoelectric machine longitudinal axis 25 around a stator bore 40. Said stator axial segments 30 have axial length 72 usually less than their external diameter 74, have two generally plane surfaces 75 (one of which is not shown) disposed generally normally to the dynamoelectric machine longitudinal axis 25, a generally cylindrical external surface 76 extending between the two plane surfaces 75, and an internal surface 77 adjacent to the stator bore 40.

A radial segment of fanfolded SMCR axial segment 32 is shown disposed abutting a radial segment of STA axial segment 34, with the inner edges 58 of the fanfolded strip 56 closely adjacent to the outer surface 76 of the STA axial segment 34.

A cutaway radial segment of a plane SSR 33 is shown which axially abuts the STA axial segment 34 and fanfolded SMCR axial segment 32. The plane SSR 33 is bonded to the axial surface 75 of the STA axial segment 34. This plane SSR 33 axially abuts fold lines 55 of the fanfolded strips 56 in the SMCR axial segment 32 at their inner edges 58 where the fanfolded strips 56 abut the radially outer surface 76 of the STA axial segment 34.

The teeth 71 in the STA axial segments 34 are joined to each other and supported in a variety of ways described in the parent application and prior continuation-in-part application. These two applications are hereby each incorporated herein by reference in their entirety. These slots 70 and teeth 71 register with the slots 36 and teeth 37 of the plane SSR 33, to which they are bonded for support, alignment, and transmission of torque. This structure is repeated a number of times as shown in FIG. 1.

Where the inner edges 58 of the faces 57 of the fanfolded SMCR axial segments 32 (FIG. 3) abut the generally cylindrical external surface 76 of the STA 34 axial segments (FIG. 3) small triangular air gaps 80 increase the reluctance of the path between the external surface 76 of the STA axial segments 34 and the fanfolded SMCR axial segments 32. The axial and circumferential extent of these air gaps 80 may be reduced by increasing the interfold pitch, most conveniently done by decreasing each face 57 width of the fanfolded SMCR axial segment 32. The increased pitch decreases the area of each triangular air gap 80. In order to eliminate these small triangular air gaps 80, fanfolded SSR structures 100 (FIG. 4) which mate closely with axially abutting fanfolded SMCR axial segments 32, may be fabricated.

Figure 4:
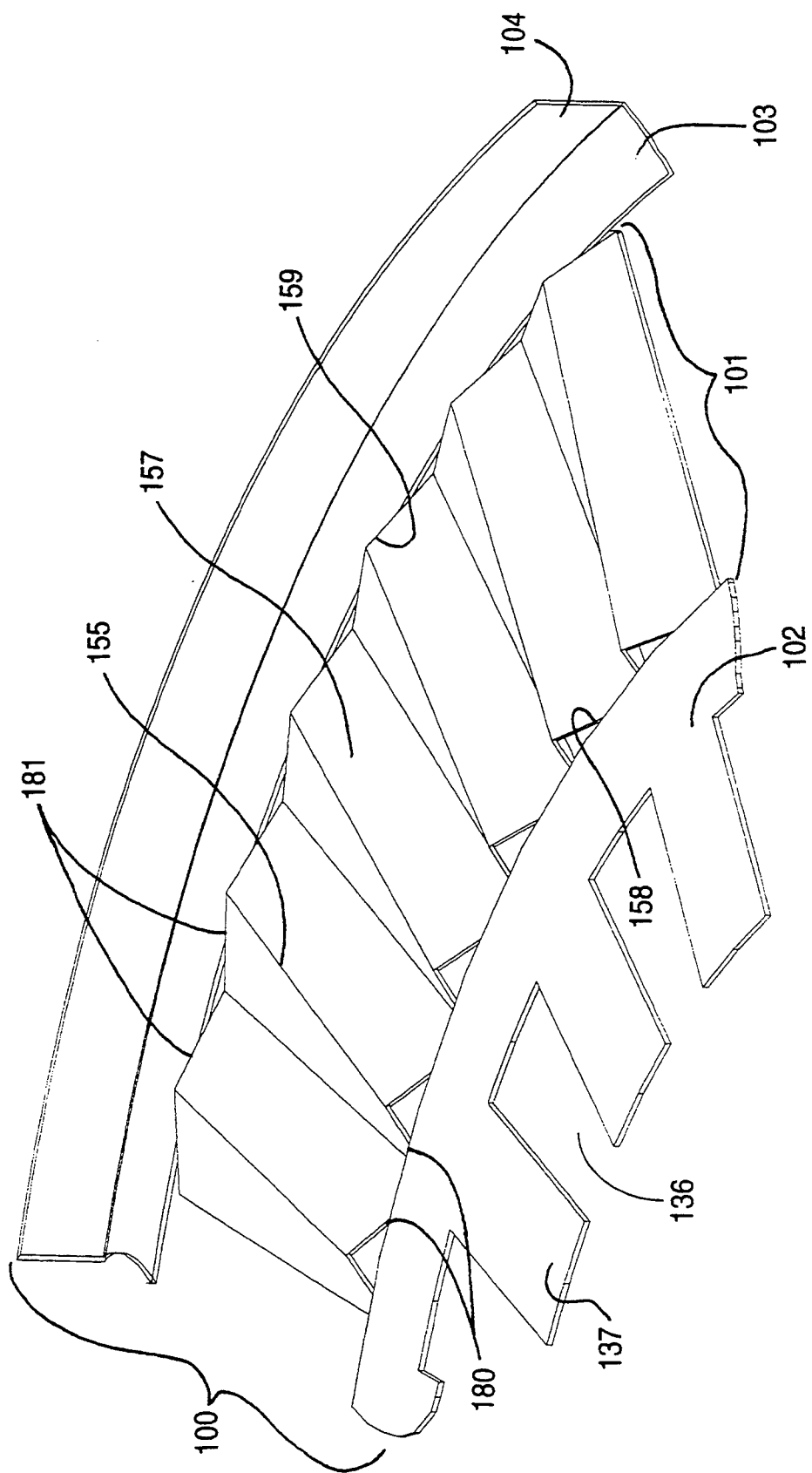
FIG. 4 is a cutaway isometric view of a segment of a fanfolded stator support ring which mates axially with the folded stator magnetic circuit ring of FIG. 2b in a composite stator structure.

In FIG. 4, a cutaway section is shown which may be substituted for the plane SSR 33. This fanfolded SSR 100 mates more closely with the axially abutting fanfolded SMCR axial segments 32 (FIG. 3) and STA axial segment 34, substantially eliminating the triangular gaps 80. The middle portion 101 (FIG. 4) is of fanfolded structure formed, as by stamping or molding, with indentations which mate axially with the fanfolds of the adjacent fanfolded SMCR axial segment 32 (FIG. 3). The plane inner portion 102 (FIG. 4) lies generally in the midplane of the fanfolded middle portion 101, as does the plane outer portion 103. The plane outer portion 103 may be adapted for securing to the dynamoelectric machine frame 15 (FIG. 1), as for example, by an integral mounting flange 104.

The inner plane portion 102 of the fanfolded SSR 100 has an axial projection of slots 136 and teeth 137 equivalent to those of a single lamination of the STA axial segment 34 (FIG. 3). Like the teeth 37 of the plane SSR 33 (FIG. 1) the teeth 137 of the fanfolded SSR 100 are bonded to the teeth 71 (FIG. 3) of the axially abutting STA axial segment 34. (For convenience of the reader, the trailing two digits of reference numbers are repeated hereinafter to identify homologous structures, e.g., 37 and 137.)

The fanfolded middle portion 101 of the fanfolded SSR 100 includes structures homologous with those of the fanfolded SMCR 32, including fold lines 155, faces 157, inner edges 158, and outer edges 159.

This fanfolded SSR 100 construction reduces the design length of the composite stator assembly 18 (FIG. 1) and associated rotor assembly 20 (not shown) by eliminating the triangular airgaps 80 (FIG. 3). The inner edges 158 of the fanfolded middle portion 101 of the fanfolded SSRs 100 pass through the plane of the inner plane portion 102 between each fold 155 of the fanfolded middle portion. The fanfolded middle portion 101 joins the inner plane portion 102 at crossover points 180 and joins the plane outer portion at crossover points 181. Both plane SSRs 33 (FIGS. 1 and 3) and fanfolded SSRs 100 (FIGS. 4 and 5), may be formed of ferromagnetic material, as for example by stamping, or structural plastic, as for example by molding.

Figure 5:
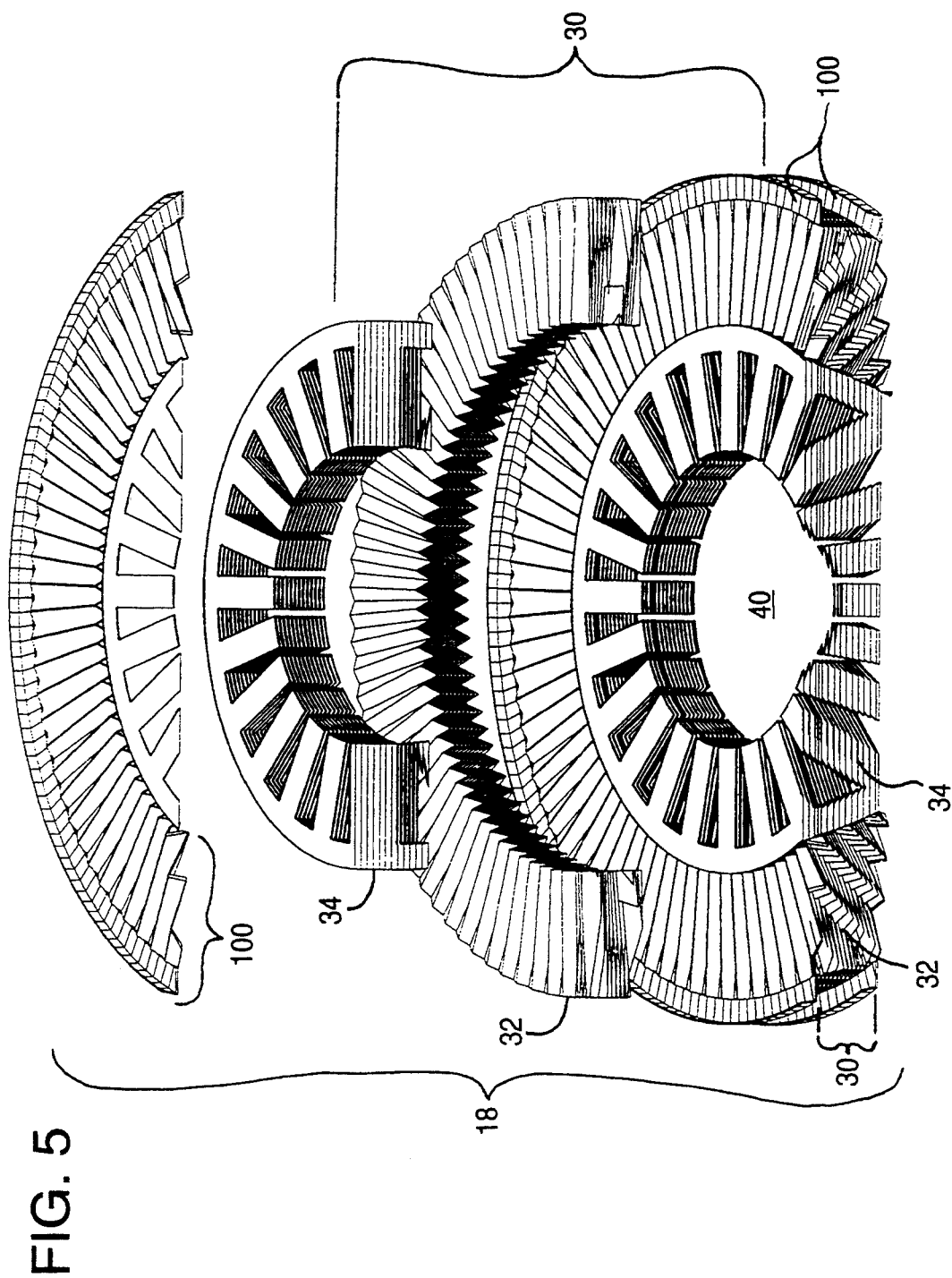
FIG. 5 is an the exploded cutaway isometric drawing of two axial segments of the composite stator structure of FIG. 1 incorporating a fanfolded stator support ring. An additional fanfolded stator support ring segment is exploded upward for clarity.

To illustrate the assembled relationships of the STA 34 (FIG. 1), SMCR 32, and fanfolded SSR 100 (FIG. 4) axial segments, two axial segments 30 (FIG. 1) of the composite stator assembly 18 using the constructions of FIG. 3 and FIG. 4 hereinabove are illustrated in the exploded cutaway isometric drawing of FIG. 5. An additional cutaway fanfolded SSR 100 is exploded upward for clarity of illustration. Herein the STA axial segment 34 surrounds the stator bore 40. The fanfolded SMCR axial segment 32 radially abuts the STA 34 and has the same axial extent. The fanfolded SSRs 100 are disposed axially abutting the fanfolded SMCR axial segments 32 and the stator tooth assembly axial segments 34 and extend radially beyond the fanfolded SMCR axial segments 32 for securing to the motor frame 15 (FIG. 1).

Referring again to FIG. 4, torque reaction forces in the fanfolded SSR 100 are concentrated at the inner crossover points 180 and the outer crossover points 181. Motor torque reaction is transmitted through the inner crossover points 180 and outer crossover points 181 in passing from the inner plane portion 102 which is bonded to the STA 34 (FIG. 3), through the fanfolded middle portion 101, through the plane outer portion 103 and to the motor frame 15 (FIG. 1), most conveniently by bonding to the mounting flange 104 (FIG. 4).

These torque reaction forces produce high concentrations of circumferential shear stress at the crossover junctions 180, 181 because, as shown in FIG. 4, the area of each crossover junction is of the order of the SSR 100 material thickness, squared.

Further, as shown in FIG. 4, these torque reaction forces are delivered to the midpoint of the fanfold face 157 at each crossover point 180, circumferentially the most compliant point of the face 157, as this midpoint is equidistant from stiffening fold lines 155 and is on an edge 158 of said face 157. Though there may be a hundred or more such crossover junctions 180 in each fanfolded SSR 100 and a dozen or more fanfolded SSRs 100 in a typical industrial dynamoelectric machine, if the fanfolded SSR 100 (FIG. 4) is of thin stock (5 mil) to reduce iron losses this configuration is torsionally somewhat compliant and can transfer torsional forces to the abutting SMCR axial segments 32. If the abutting SMCR axial segments 32 are fabricated of AFM, this torque reaction transfer may impair magnetic performance.

Torsional forces are a lesser problem at the fanfold face 157 outer edge 159 crossover junctions 181 as the lever arm from the dynamoelectric machine longitudinal axis 25 is greater than said lever arm at the inner edge 158 and the angulation of the faces 157 to the outer plane portion 103 at the outer crossover junctions 181 is less than is the angulation between the inner plane portion 102 and faces 157 at the inner crossover junction 180. At crossover junctions 181 the area of the crossover junction 181 between the middle fanfolded portion 101 and the outer plane ring 103 is increased over the area at the inner crossover junction 180 by the greater circumferential extent of the outer crossover junction 181, lowering local circumferential shear stress, and the circumferential projection of the fanfold face 157 axial extent is less at the outer edge 159 than it is at the inner edge, reducing circumferential compliance of the outer edge 159 of the fanfold face 157.

Figure 6A:
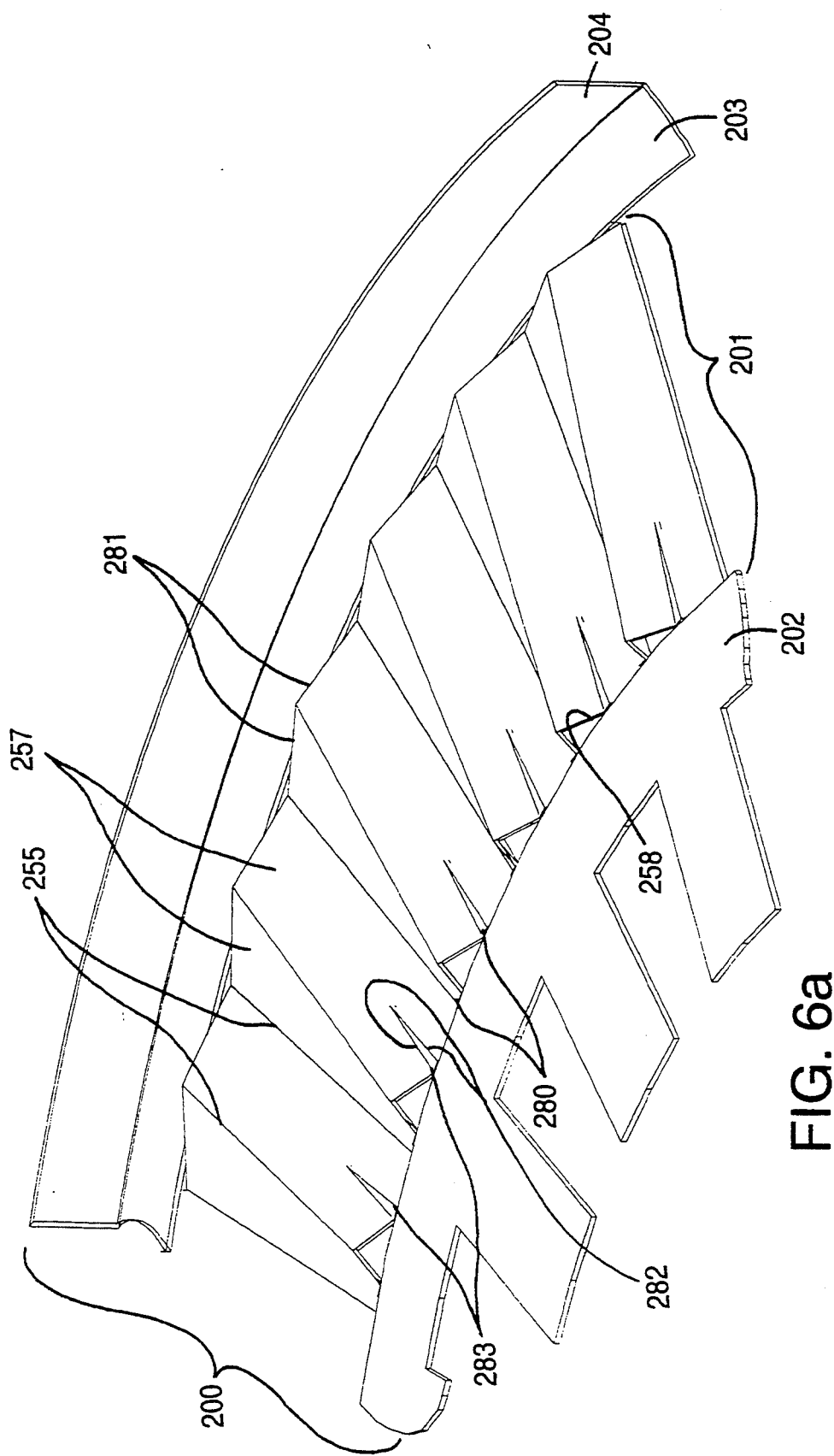
FIG. 6a is a cutaway isometric view of a segment of a fanfolded stator support ring having folds localized along the inner edges of the fanfolded faces.

The circumferential shear stress at crossover junctions 180 and 181 may be reduced by increasing fanfold pitch, or by modifying the SSR 100 stamping or molding processes to increase the circumferential extent of the junction 180 of plane inner portion 102 and fanfolded middle portion 101. As shown in FIG. 6a a fanfolded SSR 200 has fanfolded middle portion 201, and plane inner portion 202 and plane outer portion 203. The fold lines 255 and fanfold faces 257 are much as they are in FIG. 4, but in this FIG. 6a the inner crossover junctions 280 have been extended by local folds 282 extending partially across the fanfolded strip 56, said local folds 282 disposed along the inner edges 258 of the fanfold faces 257. These local folds 282 create narrow plane triangular portions 283 in the fanfold face 257, the plane of which narrow plane triangular portions 283 generally parallels the plane of the plane inner portion 202 of the fanfolded SSR 200. By extending the crossover junctions 180 these local folds 282 can conveniently reduce crossover junction 180 stresses severalfold. The same technique may be used at the outer crossover junctions 281 (not shown).

Figure 6B:
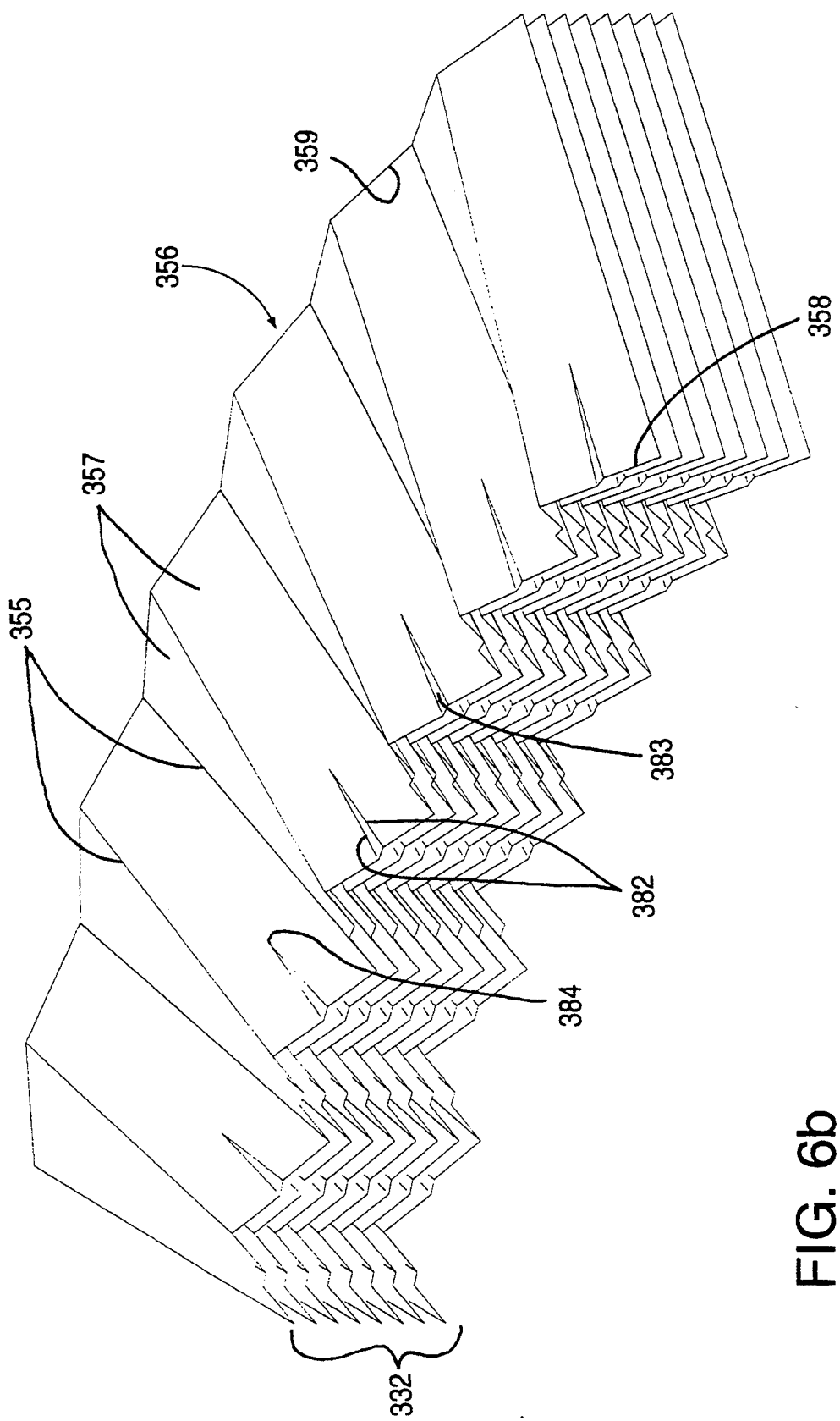

As a corollary of the extended crossover junction 280 in the fanfolded SSR 200 the folding pattern of the abutting fanfolded SMCR axial segment 32, (FIG. 2b) may be modified to improve the fit with the axially adjacent fanfolded SSR 200, as shown in FIG. 6b. Here the fold lines 355, fanfold faces 357, and outer edges 359 are generally as are their counterparts in the fanfolded SMCR 32 of FIG. 2b, but the inner edges 358 are herein modified to match the inner edges 258 of fanfolded SSR 200 (FIG. 6a). The inner edges 358 have local folds 382 and small triangular plane areas 383. These small triangular plane areas 383 create stresses at their apices 384 in the larger fanfold face 357. These stresses are tolerable in silicon steels, which elongate 10 to 30 percent to break, but are difficult to manage in AFMs having a tenth the elongation to break, and may degrade AFM magnetic performance. If AFMs are used, prudence may dictate the use of the simple fanfolded SMCR 32 of FIG. 2b with the fanfolded SSR of FIG. 6a, accepting as a price of poorer fit and better magnetic performance an elongation of the composite stator assembly 18.

Figure 7A:
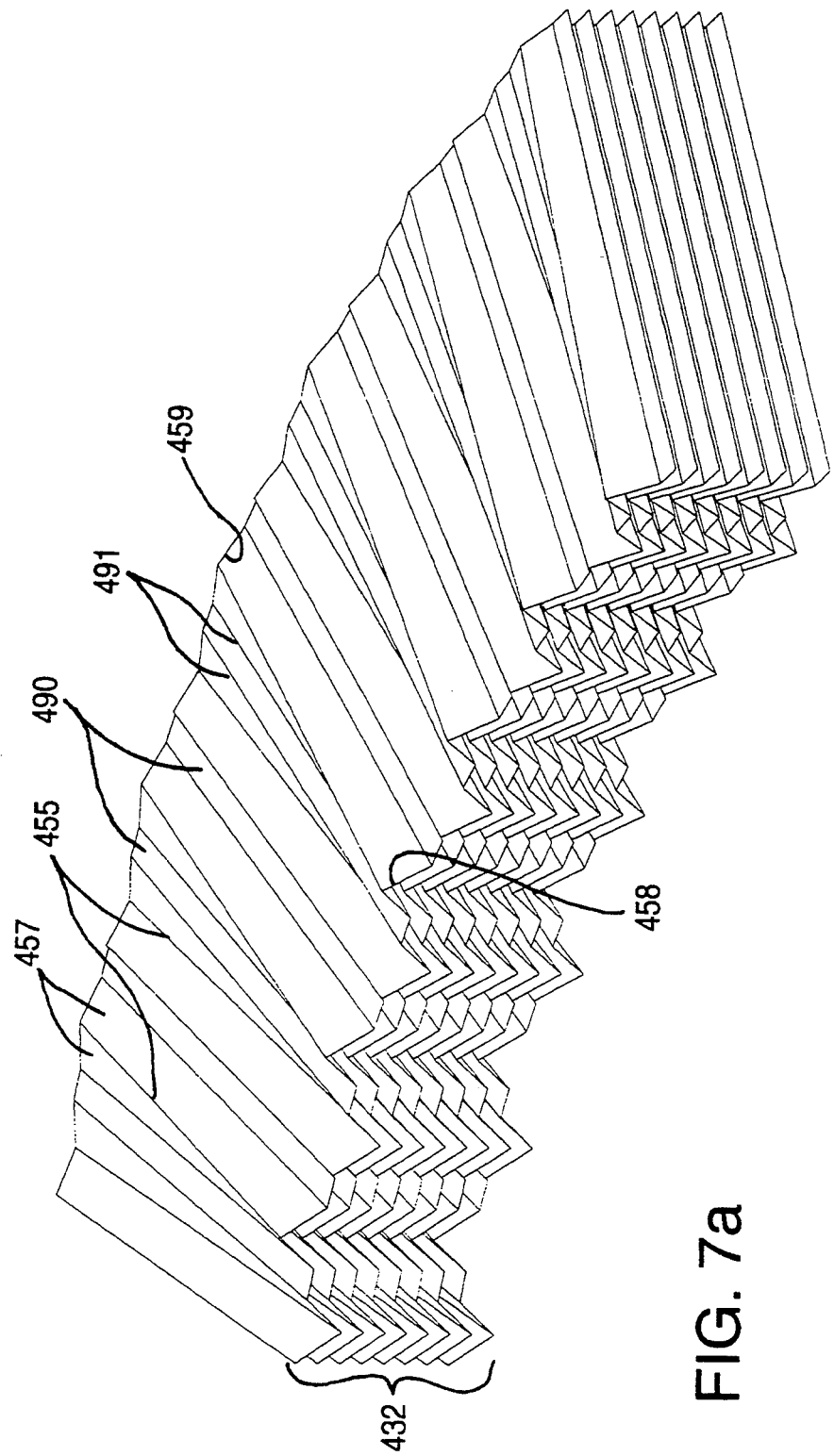
FIG. 7a is a cutaway isometric view of a segment of generally fanfolded stator magnetic circuit ring having minor folds extending entirely across the fanfolded faces from inner edge to outer edge.

A derivative of the fanfolded ferromagnetic strip form 356 described in FIGS. 6a and 6b which circumvents stress problems at the apices 384 of plane triangular areas 383 hereinabove is shown in FIG. 7a. In this FIG. 7a the fold lines 455 lie alternately on opposite sides of a plane (not shown) normal to the dynamoelectric machine longitudinal axis 25. These fold lines 455 in the ferromagnetic strip 456 are each adjoined by two faces 457. The faces 457 angled to the dynamoelectric machine longitudinal axis 25 have characteristics much like those of the faces 57 (FIGS. 2a and 2b) of the simple fanfold, having more acute fold angles at inner edges 458 (FIG. 7a) than at outer edges 459 and a twist in each angled face 457. Between these pairs of angled faces 457 adjoining a fold line 455 is a plane face 490 generally normal to the dynamoelectric machine longitudinal axis 25 and bounded by fold lines 491. Fold lines 455 and 491 extend entirely across the ferromagnetic strip from the first edge to the second edge and are less predisposed to induce inner edge 458 stresses than are the local narrow triangular planes 383 in otherwise simple fanfold faces 357 described hereinabove (FIG. 6b). In this configuration (FIG. 7a) ferromagnetic strip 456 folding is more complex than in simple fanfold, as six folds are required to complete the folding cycle shown in FIG. 7a, rather than the two in simple fanfolding as in FIGS. 2a and 2b.

Figure 7B:
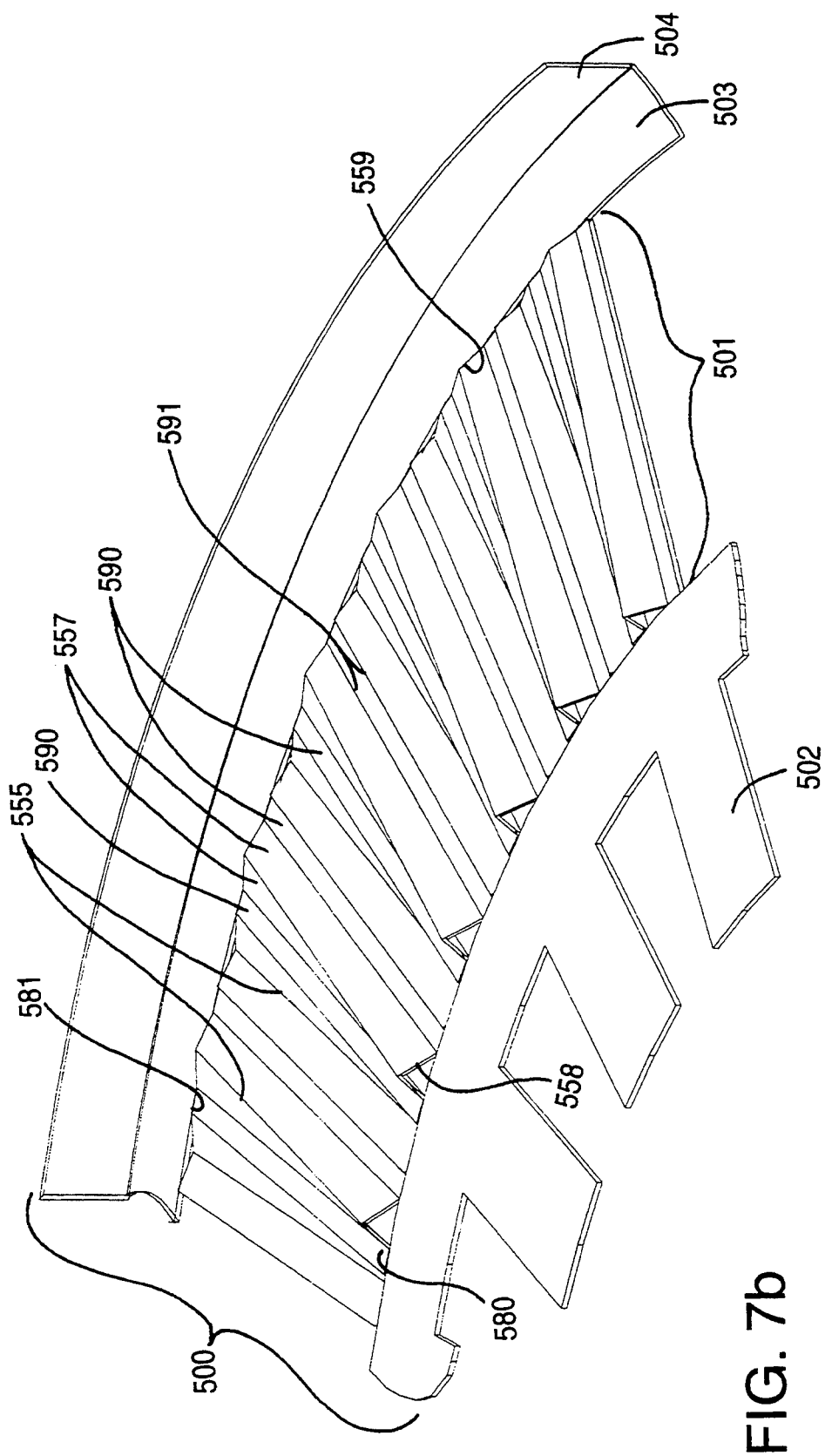

FIG. 7b illustrates a folded SSR 500 which mates axially with the folded SMCR 432 of FIG. 7a. This folded SSR 500 (FIG. 7b) has a folded middle portion 501, a plane inner portion 502, and a plane outer portion 503. The folded middle portion 501 has therein fold lines 555 each adjoined by two faces 557. The faces 557 have characteristics much like those of the faces 57 (FIGS. 2a and 2b) of the simple fanfold, having more acute fold angles at inner edges 558 (FIG. 7b) than at outer edges 559 and a twist in each angled face 557. Between these pairs of angled faces 557 sharing a common fold line 555 is a plane face 590 generally perpendicular to the dynamoelectric machine longitudinal axis 25 and bounded by fold lines 591. Fold lines 555 and 591 extend entirely across the folded middle portion 501 from the first edge to the second edge, much as if, in FIG. 6a, local fold lines 282 on both inner edge 258 and outer edge 259 (not shown) of the fanfolded middle portion 201 of SSR 200 had been extended across the fanfold faces 257 and joined. These plane faces 590 (FIG. 7b) considerably reduce circumferential stress concentrations at crossover junctions 580 and 581 between inner 502, middle 501 and outer 503 portions of the folded SSR 500.

This folded SSR 500 structure has a greater torsional stiffness than the fanfolded SSR 100 of FIG. 4. Each plane face 590 of FIG. 7b functions as a "spoke" joining inner 502 and outer 503 plane portions of the folded SSR 500. The "spoke" face 590 is further stiffened against both circumferential and axial deflection under torque reaction load by the adjacent angled faces 557 which, taken together with the spoke face 590, form approximately "Z-section" structural members.

Figure 8A:
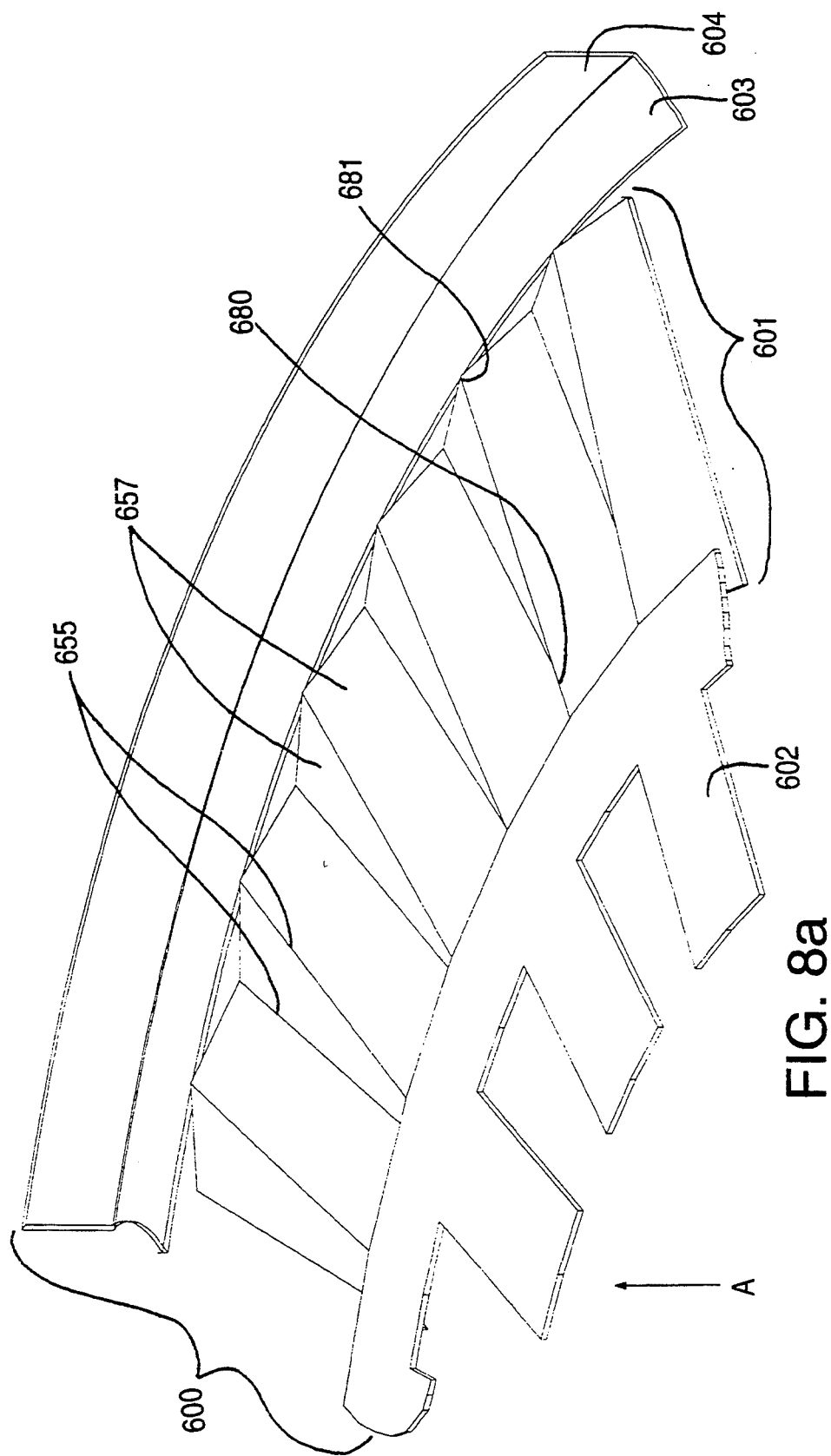
FIG. 8a is a cutaway isometric view of a segment of an alternative fanfolded stator support ring which mates axially with the fanfolded stator magnetic circuit ring of FIG. 2b.

In the fanfolded SSR 600 of FIG. 8a the fanfolded SSR 100 (FIG. 4) has been modified from the configuration of FIG. 4 to improve torsional rigidity. The fanfolded middle portion 601 (FIG. 8a) of fanfolded SSR 600 is like the fanfolded middle portion 101 of FIG. 4. In this FIG. 8a the inner plane portion 602 and the outer plane portion 603 have been axially displaced in the direction of arrow A to positions closer to the fold lines 655 from positions in the midpoints of the fanfold faces 657. In this case the attachment points are indeed at the fold lines 655, creating a connection between fanfolded SSR 600 inner plane portion 602 and outer plane portion 603 at a point in the fanfolded portion 601 having considerable stiffness because of the included angle between adjacent faces 657. This configuration replaces two crossover junctions 180 (FIG. 4) for each fanfold cycle with a single attachment or crossover junction 680, 681 in FIG. 8a.

Figure 8B:
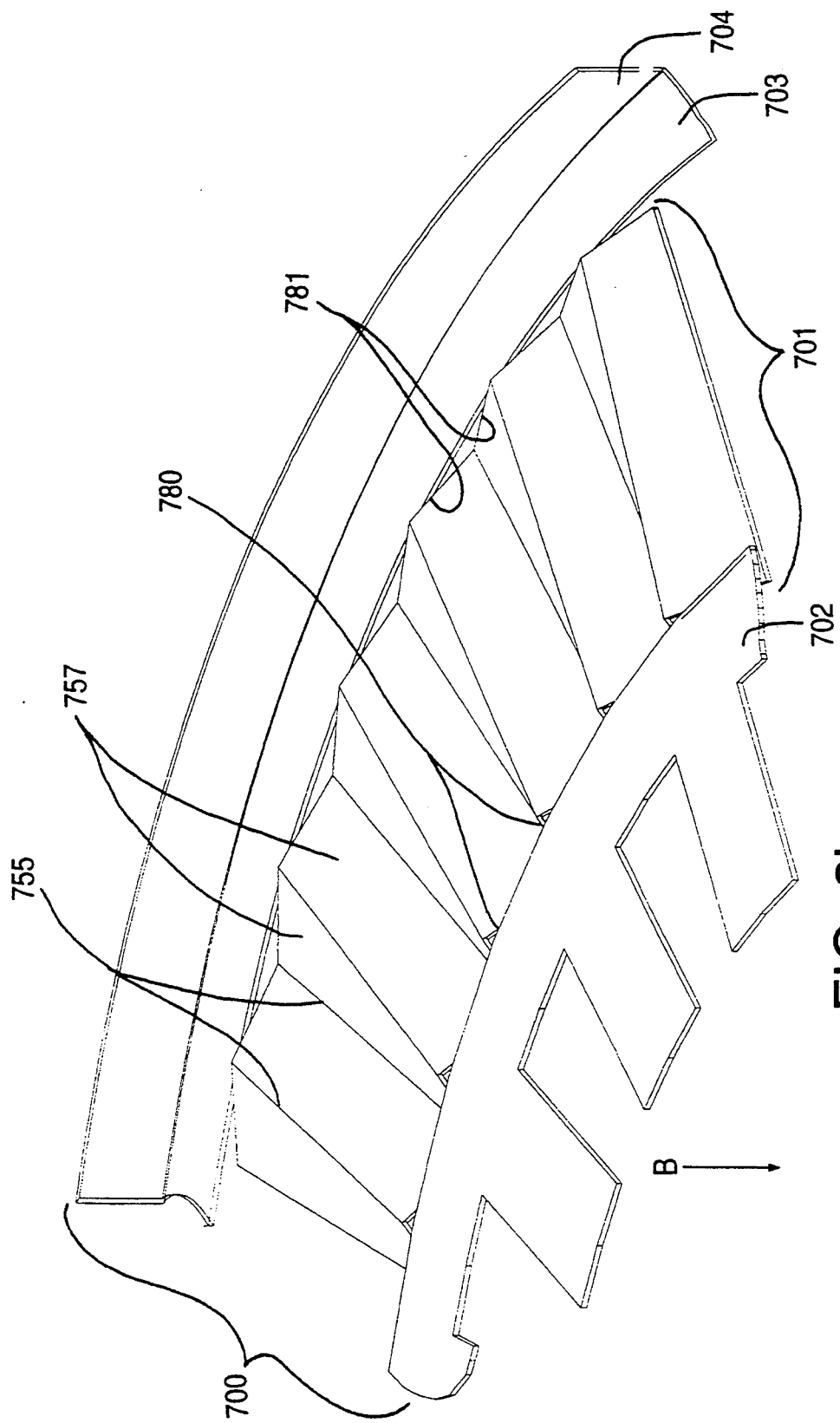
FIG. 8b is a cutaway isometric view of a segment of another alternative fanfolded stator support ring which mates axially with the fanfolded stator magnetic circuit ring of FIG. 2b.

As shown in FIG. 8b, a fanfolded SSR structure 700 which is torsionally stiffer than those of FIGS. 4 or 8a is created by a small axial repositioning of the inner plane portion 702 (FIG. 8b) and outer plane portion 703 of the SSR 700 in the direction of arrow B from the fold lines 755 toward the fanfold face 757 midpoints. This yields a fanfolded SSR 700 having paired crossover junctions, 780 and 781, of the fanfolded middle portion 701 with the inner plane portion 702 and outer plane portion 703 of the SSR 700 in each fanfold cycle, while maintaining the crossover junctions 780 closely adjacent to the stiffening fold lines 755. This effectively creates an angle-section "spoke" from the inner crossover 780 to the outer crossover 781.

In the fanfolded SSRs 600 and 700 of FIGS. 8a and 8b respectively the triangular plane areas 383 of SSR 200 (FIG. 6a) may be used to reduce circumferential shear stress at the crossover junctions 680, 780, 681, and 781.

Folding patterns for the generally fanfolded strip and fanfolded SSRs forms described hereinabove may be further evolved into a variety of forms which are not fanfolded. Two examples are described hereinbelow.

Figure 9A:
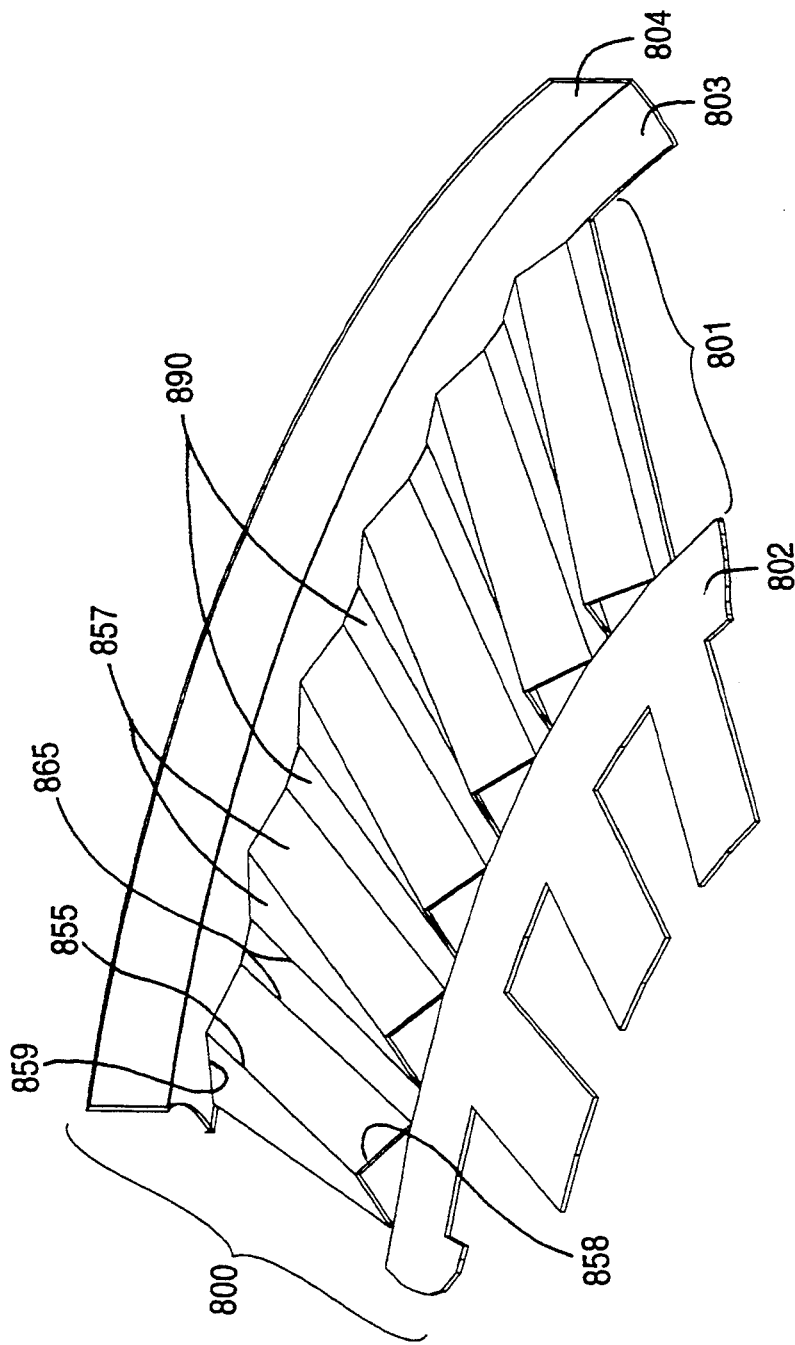
FIG. 9a is a cutaway isometric view of a segment of a folded stator support ring having a generally gabled fold pattern.

The folded SSR 800 of FIG. 9a has middle folded portion 801, inner plane portion 802, and outer plane portion 803 similar to those of preceding examples. However this structure is simpler than the folded SSR 500 of FIG. 7b, incorporating a folding cycle of only three faces rather than six. Each fold line 855 (FIG. 9a) is adjoined by two faces 857, each face 857 having therein a twist between inner edge 858 and outer edge 859 like that of other fanfolded faces described hereinabove. Each face 857 is bounded by two fold lines 855 and 865. Fold lines 865 bound plane faces 890, said plane faces 890 being generally perpendicular to the dynamoelectric machine longitudinal axis 25. Each plane face 890 functions like the "spoke" plane faces described hereinabove. The "spoke" face 890 is circumferentially and axially stiffened by the adjacent angled faces 857, causing it to behave as a structural channel with a considerably higher moment of inertia in the plane perpendicular to the dynamoelectric machine longitudinal axis 25 than has the "spoke" face 890 alone. This channel structure is well adapted to torque reaction transmission.

Figure 9B:
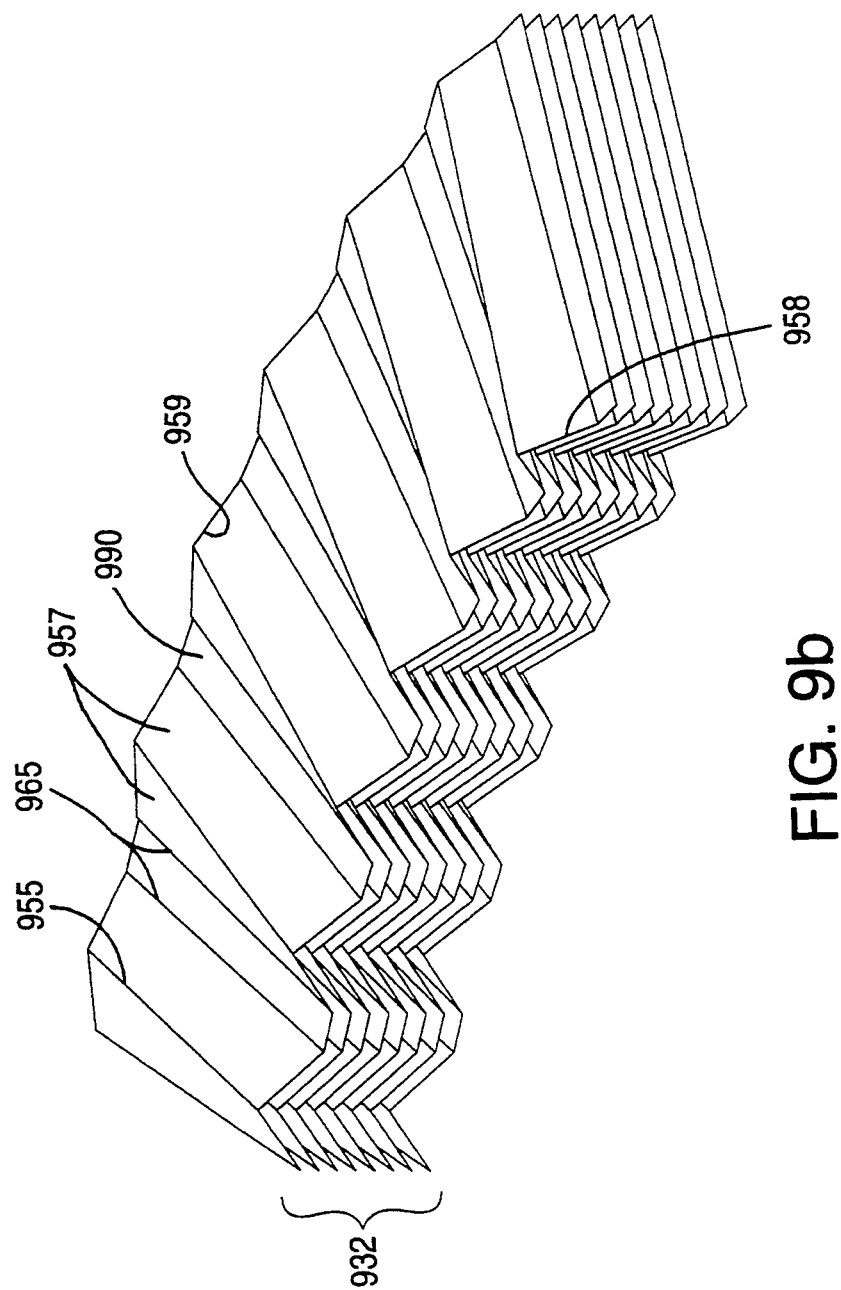

FIG. 9b shows the corresponding folded SMCR 932 which mates axially with the folded middle portion 801 of the folded SSR 800. This folded SMCR 932 has a generally gabled appearance arising in a folding cycles of three faces. Each fold line 955 is adjoined by two faces 957, each face 957 having therein a twist between inner edge 958 and outer edge 959 like that of other fanfolded faces described hereinabove. Each face 957 is bounded by two fold lines 855 and 865. Fold lines 865 bound plane faces 990, said plane face 990 being generally perpendicular to the dynamoelectric machine longitudinal axis 25.

Simplifying alternatives to the structures of FIGS. 9a and 9b are to insert a plane "spoke" face 890, 990 only between alternate pairs of angled faces 857, 957, or even less frequently. Naturally, to achieve minimum stator length the folded ferromagnetic strip 932 will match the form of the folded SSR 800 middle portion 801.

In folding patterns as described in the examples described hereinabove the designer may elect to use fold lines which are not perpendicular to the strip centerline CL 52 (FIG. 2a) and not radial to the dynamoelectric machine longitudinal axis 25 (FIG. 9b.

Fanfolded SSRs 100 (FIG. 4) with fanfolded middle portion 101 having smaller fold angles $\alpha$ and $\beta$ may be devised to stiffen the fanfolded SSR 100 and improve torque reaction transmission. The length of the composite stator assembly 18 may be extended thereby. Sinuous strip and stator support ring structures described hereinbelow may be similarly adapted.

Figure 10A:
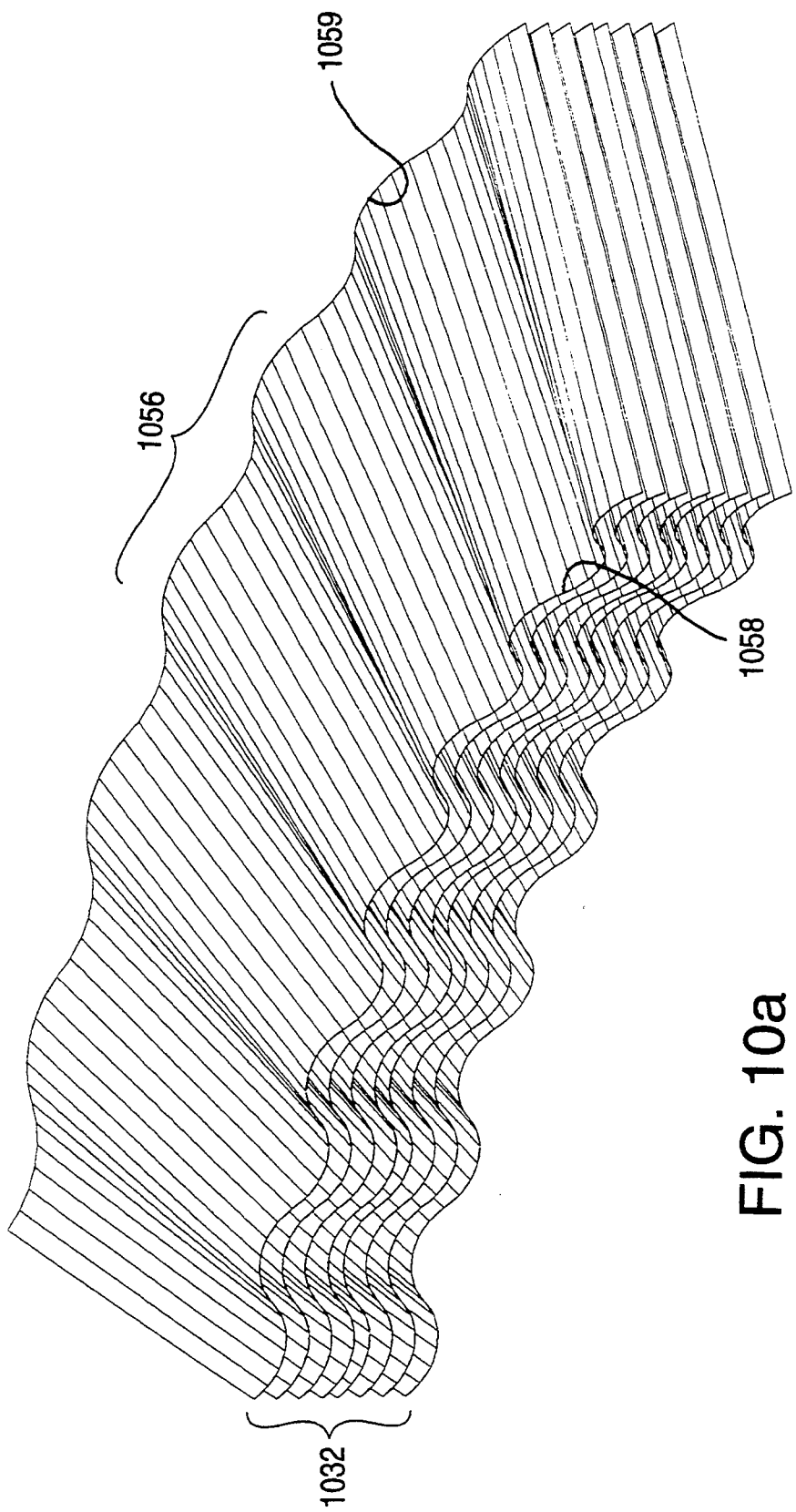
FIG. 10a is a cutaway isometric view of a segment of stator magnetic circuit ring having sinuous axial deflections without discrete fold lines.

A sinuous SMCR axial segment 1032 is shown in FIG. 10a. This form, which does not include discrete fold lines, may indeed have a sine wave circumferential cross section or may have other curve forms, e.g., circular, exponential, polynomial, as suggested for discrete folds in the parent application and prior continuation in part, but here the deformations are continuous. The particular virtue of this form of "wavy" sinuous SMCR 1032 is that, when compared with other structures described hereinabove having well-defined fold lines, e.g., 55 of FIG. 2a, and with them substantial mechanical stress at said fold lines (in practice usually relieved by annealing), the sinuous form 1032 (FIG. 10a) may have large radii and reduced local mechanical stresses. This form can be difficult to handle in fabrication, as the axial deflections at the outer edge 1059 may be small, i.e., the material may be nearly plane, and, particularly in large dynamoelectric machines having large strip axial deflection radii, there may be no permanent deformation of the ferromagnetic strip material to cause it to retain its formed shape prior to annealing. In some cases the axial-deformation-induced stresses may be sufficiently small that annealing prior to assembly of the composite stator assembly 18 is not required.

Figure 10B:
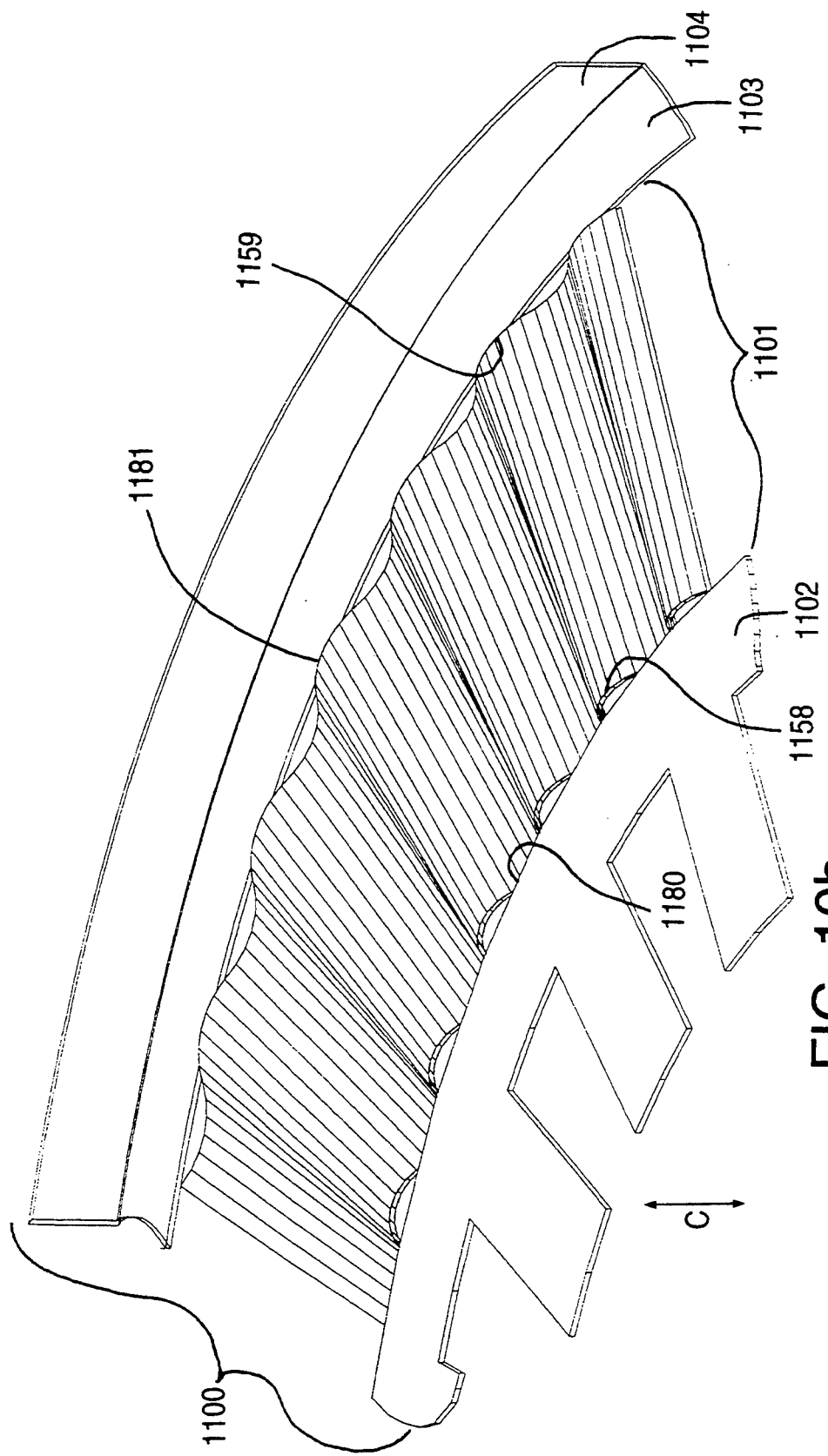

FIG. 10b shows a sinuous SSR 1100 having middle portion 1101 with an axially sinuous form corresponding to the SMCR 1032 described hereinabove (FIG. 10a), a inner plane portion 1102 (FIG. 10b), and an outer plane portion 1103. The junctions between the sinuous middle portion 1101 and the inner plane portion 1102 are at the inner crossover junctions 1180. The junctions between the sinuous middle portion 1101 and the outer plane portion 1103 are at the outer crossover junctions 1181. These crossover junctions 1180, 1181 are shown here in this FIG. 10b at the point of steepest angulation of the sinuous middle portion 1101 to the inner plane portion 1102 and the outer plane portion 1103. As noted in discussing SSRs for simple fanfolding hereinabove (re FIG. 4), this positioning of the crossover junctions 1180 and 1181 produces a relatively compliant SSR 1100. By axially displacing the inner portion 1102 and the outer portion 1103 appropriate distances, parallel to arrow C, the crossover junctions 1180 and 1181 with the sinuous middle portion 1101 may be placed at points where the sinuous middle portion 1101 is substantially coplanar with a plane normal to the dynamoelectric machine longitudinal axis 25, so that the crossover junctions 1180 and 1181 are elongated, reducing circumferential shear stress. With this placement of crossover junctions 1180 and 1181 the "crest" of the sinuous middle portion 1101 functions much like the plane "spokes" e.g., 890 of FIG. 9a, of previous examples.

It may be seen that the preferred embodiments of composite stator assembly 18 components disclosed in this invention may have a variety of forms assembled in various combinations from the components herein disclosed. The structures described for folded SMCRs 32 have in common deformations, whether they be discrete folds or sinuous axial deflections, extending entirely across the ferromagnetic strips from first edges to second edges. The SSR structures shown have structures of their respective middle portions 101, 201, 501, 601, 701, 801, 1101 such that they can mate closely with abutting stator magnetic ring structures 32, 332, 432, 32, 32, 932, 1032, respectively, in order to minimize axial length of the composite stator assembly 18. Where maximum torsional strength is required, plane SSRs 33 or hybrids of plane SSRs 33 and folded SSRs may be employed.

Dynamoelectric machine structures having a relatively short axial extent ("pancake" structures), as in automobile alternators, offer an interesting special case of the composite stator assembly 18, inasmuch as they can be fabricated with a composite stator having a single axial segment 30. In this case, the required SSRs may assume a variety of forms other than the generally disk-like forms disclosed elsewhere in this invention, because, if not ferromagnetic, they do not contribute to the axial length of stator ferromagnetic structures or to iron losses. Two SSRs in a "pancake" dynamoelectric machine may each have considerable axial extent, be cut out to clear stator windings, may not extend radially into the region of the folded SMCRs 32, may extend radially into this region only enough to isolate folded SMCR structures from the dynamoelectric machine frame 16, or may be secured to the end bells 17 rather than the frame 15. Nonetheless their functions are as described hereinabove.

In industrial motors of 1 to 125 horsepower rating the composite stator structures described hereinabove can reduce stator iron losses by about 65 percent compared to prior art with AFM stator magnetic circuit ring axial segments 32, 332, 432, 932, 1032, together with punched electrical steel STA axial segments 34 and punched ferromagnetic SSRs 100, 200, 500, 600, 700, 800, 1100 of common thickness. Greater reduction of iron loss, approaching 75 percent, may be achieved with molded structural plastic SSRs 100, 200, 500, 600, 700, 800, 1100 and STA axial segments 34 formed as helical windings from thin ferromagnetic strip stock as described in the parent application and prior continuation in part. Where the fundamental frequency of alternating current applied to the composite stator structures described in the present invention can be raised, as in automobile alternators, very significant reductions of dynamoelectric machine weight may be achieved.

The folded ferromagnetic strip shown in, for example, FIG. 2a is formed in a circle about the longitudinal axis of an dynamoelectric machine. A plurality of similar strips are stacked one on top of the other or formed continuously in a coil structure to the desired axial thickness. However, the folds on the inner edges of each of the stacked strips 53 have a greater fold angle $\alpha$ at the inner edge 58 compared to the fold angle $\beta$ of the outer edge which has been folded to form one fold associated with the outer edge 59. Consequently, the vertical projection h along longitudinal axis 25 of the thickness t of the elongate ferromagnetic strip 51 varies from the thickness t when $\alpha$ is zero to infinity when $\alpha$ is 180° Naturally, a 180° value for $\alpha$ is impractical and would not be achieved in a practical system. However, the projection h along longitudinal axis 25 of the thickness t of strip 51 does increases as the function t·sec $(\alpha/2)$. Thus, the thickness of a plurality of strips 51 stacked one on top of the other with their centers of curvature being along longitudinal axis 25 is more dense along inner edge 58 than along outer edge 59. The density difference between inner edge 58 and outer edge 59 decreases as the angle $\beta$ approaches $\alpha$ but the radius of curvature increases as these two approach each other for a given width of strip 51. Thus, the actual dimensions of strip 51 and values of angles $\alpha$ and $\beta$ determine the radius of curvature and the relative density of the material along inner edge 58 of the plurality of stacked strips compared to the density of materials along outer edge 59 of the plurality of stacked strips. Thus, in a practical application, the inner edges 58 of a plurality of stacked strips 51, with the radius of curvature of the stacked strips located along longitudinal axis 25, will be essentially solid material along inner edge 58 but of reduced density along outer edge 59 with air gaps between the edges of adjacent strip 51.

While the structures disclosed in FIGS. 2a through 10b are shown as having substantially constant width, as a practical matter the width does not have to be constant but rather can vary as a function of length or as desired provided the resulting strip has structural integrity and can perform satisfactorily the function for which it has been formed.

While certain embodiments of this invention have been described, other embodiments of this invention will be apparent to those skilled in the art in view of the above disclosure.

What is claimed is:

1. A radial-gap dynamoelectric machine having a longitudinal axis and a stator structure, said stator structure comprising:
    an elongate ferromagnetic strip having a first inner edge and a second outer edge,
        said elongate ferromagnetic strip having folds therein extending entirely across said elongate ferromagnetic strip from first inner edge to the second outer edge,
        said folded elongate ferromagnetic strip being deflected about the longitudinal axis of the dynamoelectric machine to form a closed geometric figure, said elongate ferromagnetic strip having in general greater fold angles at the inner edge of the geometric figure than at the outer edge such that the projection of the elongate ferromagnetic strip edge at the inner edge of the geometric figure on a plane perpendicular to the longitudinal axis is shorter than the projection of said elongate ferromagnetic strip edge at the outer edge of the geometric figure onto the same plane,
        said elongate ferromagnetic strip having superposed portions placed closely adjacent to each other along the longitudinal axis in two or more turns, such that immediately adjacent folds in each turn are in registration with corresponding adjacent folds of at least one adjacent layer of said strip to form a substantially solid laminated magnetic flux path in the stator.

2. A structure as in claim 1 wherein the elongate ferromagnetic strip is deflected in a plane perpendicular to the longitudinal axis of the dynamoelectric machine to form a closed figure whose projection in a plane perpendicular to the longitudinal axis of the dynamoelectric machine is a polygon.

3. A structure as in claim 1 wherein the elongate ferromagnetic strip is continuous over more than one turn about the longitudinal axis of the dynamoelectric machine and is wound into a helix whose projection in a plane perpendicular to the longitudinal axis of the dynamoelectric machine approximates a polygon.

4. A structure as in claim 1 wherein said elongate ferromagnetic strip is in the form of a plurality of separate ferromagnetic strips.

5. A structure as in claim 1 wherein the elongate ferromagnetic strip is deflected in a plane perpendicular to the longitudinal axis of the dynamoelectric machine to form a closed figure whose projection in a plane perpendicular to the longitudinal axis of the dynamoelectric machine approximates a circle.

6. A structure as in claim 1 wherein the elongate ferromagnetic strip is continuous over more than one turn about the longitudinal axis of the dynamoelectric machine and is wound into a helix whose projection in a plane perpendicular to the longitudinal axis of the dynamoelectric machine approximates a circle.

7. A structure as in claim 4 wherein said plurality of strips are wound into a helix whose projection in a plane perpendicular to the longitudinal axis of the dynamoelectric machine approximates a circle.

8. A structure as in claim 1 together with
 a dynamoelectric machine frame,
 at least one stator tooth assembly axial segment,
 at least one folded stator magnetic circuit ring axial segment disposed around the stator tooth assembly axial segment and
 at least one stator support ring affixed to said stator tooth assembly axial segment and secured to said dynamoelectric machine frame.

9. A structure as in claim 1 together with
 a dynamoelectric machine frame,
 at least one stator tooth assembly axial segment,
 at least one folded stator magnetic circuit ring axial segment disposed around the stator tooth assembly axial segment.

10. A structure as in claim 8 wherein said plurality of stator support rings are disposed perpendicularly to the longitudinal axis of the dynamoelectric machine and are spaced apart along the longitudinal axis of the dynamoelectric machine, said stator support rings being formed of ferromagnetic material.

11. A structure as in claim 8 wherein said plurality of stator support rings are disposed perpendicularly to the longitudinal axis of the dynamoelectric machine and are spaced apart along the dynamoelectric machine longitudinal axis, said stator support rings being formed of structural plastic material.

12. In a radial-gap dynamoelectric machine having
 a longitudinal axis and having
 a stator,
 an elongate ferromagnetic strip having a first inner edge and a second outer edge and a centerline between said first and second edges, said elongate ferromagnetic strip having a plurality of deflections therein extending entirely across said elongate ferromagnetic strip from the first edge to the second edge at angles with respect to the centerline of said elongate ferromagnetic strip,
 said deflections extending in both directions along the longitudinal axis from a plane perpendicular to the longitudinal axis, said elongate ferromagnetic strips being arranged about the longitudinal axis of the dynamoelectric machine to form a closed geometric figure,
 said elongate ferromagnetic strip having in general greater deflections at the inner edge than at the outer edge such that the projection of the inner edge on a plane perpendicular to the longitudinal axis is shorter than the projection of the outer edge, on the same edge
 said elongate ferromagnetic strip having superposed portions placed closely adjacent to each other along the longitudinal axis in two or more turns such that immediately adjacent axial deflections in each turn are in registration with corresponding axial deflections in adjacent turns to form a substantially solid laminated magnetic flux path in the stator.

13. A structure as in claim 12 wherein the elongate ferromagnetic strip is deflected in a plane perpendicular to the longitudinal axis of the dynamoelectric machine to form a closed figure whose projection in a plane perpendicular to the longitudinal axis of the dynamoelectric machine approximates a polygon.

14. A structure as in claim 12 wherein the elongate ferromagnetic strip is continuous over more than one turn about the longitudinal axis of the dynamoelectric machine and is wound into a helix whose projection in a plane perpendicular to the longitudinal axis of the dynamoelectric machine approximates a polygon.

15. A structure as in claim 12 wherein said elongate ferromagnetic strip is in the form of a plurality of separate ferromagnetic strips.

16. A structure as in claim 12 wherein the elongate ferromagnetic strip is deflected in a plane perpendicular to the longitudinal axis of the dynamoelectric machine to form a closed figure whose projection in a plane perpendicular to the longitudinal axis of the dynamoelectric machine approximates a circle.

17. A structure as in claim 12 wherein the elongate ferromagnetic strip is continuous over more than one turn about the longitudinal axis of the dynamoelectric machine and is wound into a helix whose projection in a plane perpendicular to the longitudinal axis of the dynamoelectric machine approximates a circle.

18. A structure as in claim 15 wherein said plurality of strips are wound into a helix whose projection in a plane perpendicular to the longitudinal axis of the dynamoelectric machine approximates a circle.

19. A structure as in claim 12 together with
 a dynamoelectric machine frame,
 a plurality of stator tooth assembly axial segments,
 a plurality of folded stator magnetic circuit ring axial segments disposed around the stator tooth assembly axial segments and
 a plurality of stator support rings bonded to said stator tooth assembly axial segments and secured to said dynamoelectric machine frame.

20. A structure as in claim 12 together with
 a dynamoelectric machine frame,
 a plurality of stator tooth assembly axial segments,
 a plurality of folded stator magnetic circuit ring axial segments disposed around the stator tooth assembly axial segments.

21. A structure as in claim 20 wherein said plurality of stator support rings are disposed perpendicularly to the longitudinal axis of the dynamoelectric machine and are spaced apart along the longitudinal axis of the dynamoelectric machine, said stator support rings being formed of ferromagnetic material.

22. A structure as in claim 20 wherein said plurality of stator support rings are disposed perpendicularly to the longitudinal axis of the dynamoelectric machine and are spaced apart along the dynamoelectric machine longitudinal axis, said stator support rings being formed of structural plastic material.

23. A method of forming an elongate ferromagnetic strip into a closed structure about a longitudinal axis which comprises
 forming an elongate ferromagnetic strip with a first inner edge and a second edge;
 forming a plurality of bends across said elongated ferromagnetic strip from the first edge to the second edge;
 arranging said elongated ferromagnetic strip about a longitudinal axis such that the projection of the first edge of said strip on a plane perpendicular to said axis is closer to said longitudinal axis than the projection of the second edge of said strip and such that said strip forms a plurality of turns about said longitudinal axis, each turn being adjacent to the previous turn and such that the bends in said strip are such that the deflection of the inner edge of said strip in each turn from a plane perpendicular to the longitudinal axis is greater than the deflection of the second edge of said strip from said plane.

24. The method as in claim 22 wherein said plurality of bends comprise a plurality of folds;

25. The method of claim 22 wherein said plurality of bends comprise a plurality of sinuous bends.

* * * * *